Patented Mar. 31, 1953

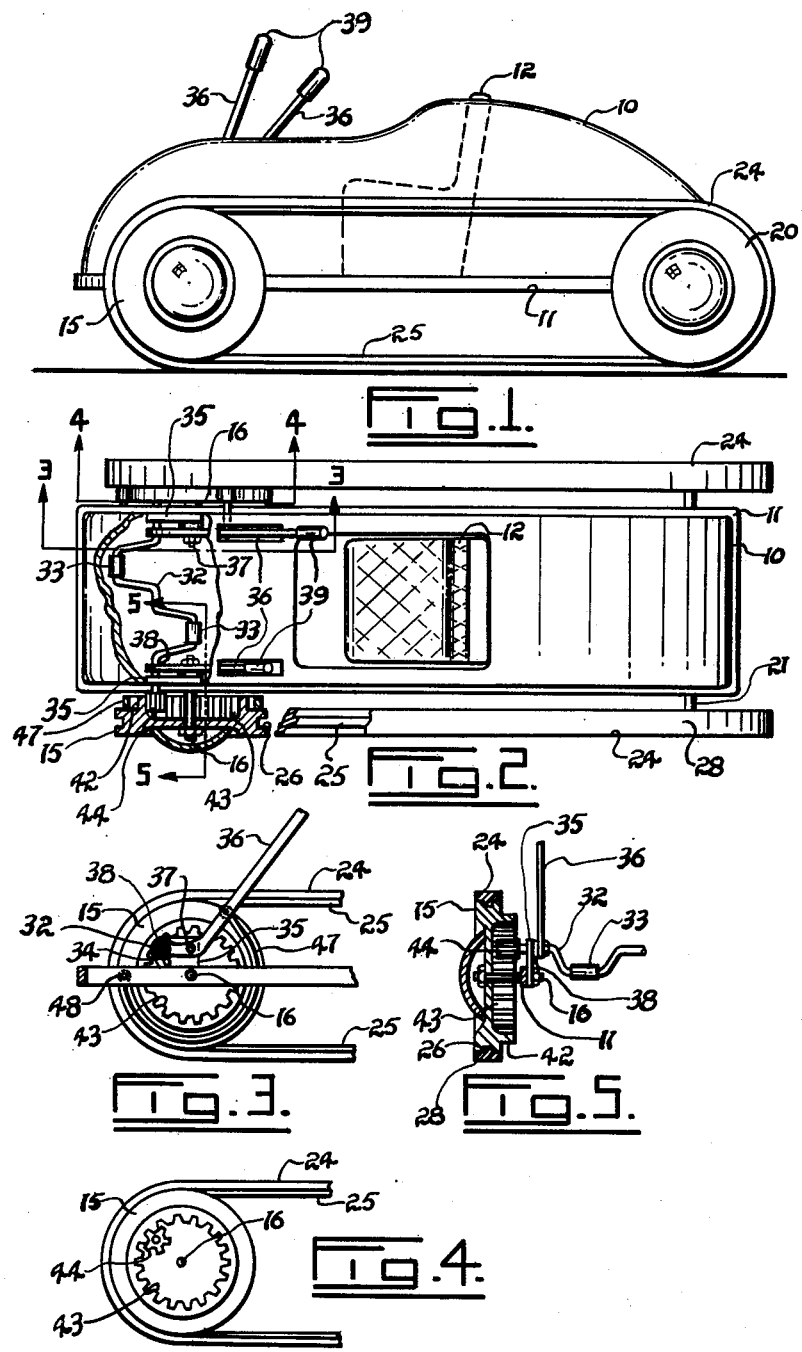

2,633,370

UNITED STATES PATENT OFFICE 2,633,370

DRIVE AND BRAKE CONTROL FOR TOY VEHICLE TRACTION MEANS

James M. Johnston, Vancouver, British Columbia, and Charles Bruce Patterson, West Vancouver, British Columbia, Canada Application March 21, 1949, Serial No. 82,555

3 Claims. (Cl. 280—211)

This invention relates to improvements in toy vehicles for children.

An object of the present invention is the provision of a toy vehicle having special braking and driving means through which it may be steered.

Another object is the provision of a toy vehicle which may be operated on uneven and rough ground.

A further object is the provision of a toy vehicle which is not very liable to run away out of control on a steep slope.

Children have played with carts and wagons for a great many years. However, these may be used only on smooth ground and they are liable to get out of control on steep slopes. Furthermore, they have not adequate braking facilities.

A toy vehicle according to this invention includes a tread belt at each side which is driven by means of foot pedals. This belt arrangement permits the vehicle to be driven over rough and uneven ground, and this forms a very great attraction for children. Furthermore, when on a steep slope, it cannot gain sufficient speed to put it out of control of the child sitting in it. This vehicle includes means through which the child may apply a brake to either or both of the tread belts. Furthermore, when each brake is applied, its belt is disconnected from the driving pedals. Consequently, when the belt on one side is held by its brake and the one on the other side is driven by the pedals, the vehicle turns towards the side of the stationary belt.

An example of this invention is illustrated in the accompanying drawings in which, Figure 1 is a side elevation of the toy vehicle.

Figure 2 is a plan view, partly in section of the vehicle.

Figure 3 is a section taken on the line 3—3 of Figure 2.

Figure 4 is a section taken on the line 4—4 of Figure 2, and

Figure 5 is a section at one side of the vehicle taken on the line 5—5 of Figure 1.

Referring to the drawings, 10 is the body of the vehicle which is supported by a frame 11, said body having a seat 12 adjacent the back end thereof. A pair of wheels 15 is mounted at the front end of the vehicle. Each wheel is independently mounted on a short shaft 16 which is connected to the frame 11. Another pair of wheels 20 is mounted at the back of the vehicle. These wheels may be mounted on a common shaft 21 which extends through the frame 11. The wheels 15 and 20 on each side of the vehicle are preferably aligned with each other. A tread belt 24 extends around each pair of aligned wheels. This belt may be formed of any suitable material, such as a rubberized fabric, and it may be formed with a rib 25 extending along its inner surface which rides in groove 26 of wheel 15 and a groove (not shown) of wheel 20. If desired, the outer surface of the belt may be formed with a tread 28.

A pedal crank 32 extends transversely of the vehicle adjacent the wheels 15, and is provided with pedals 33. This shaft extends through arcuate slots 34 in supports 35 which extend upwardly from the frame 11 at opposite sides of the vehicle. Control levers 36, one at each side of the vehicle, are pivotally mounted at 37 on the supports 35. Each lever carries a bearing 38 at its lower end adjacent the pivot 37, in which the adjacent end of the pedal crank is journalled. The control levers may be formed with handles 39 which extend towards the seat 12 of the vehicle.

Each wheel 15 has a brake drum 42 secured to its inner surface, and an internal gear 43 is mounted within this drum. An end of the pedal shaft 32 extends into the internal gear and has a small gear 44 fixedly secured thereto which is adapted to mesh with said internal gear.

There is a control lever 36 near and for each wheel 15. When the upper end of the lever is moved forwardly, the gear 44 is moved out of mesh with the gear 43. When the lever is moved rearwardly, the gear 44 is moved into mesh with the gear 43. Thus, either or both of the front wheels 15 may be connected to or disconnected from the pedal crank 32.

A brake band 47 extends over the surface of each drum 42, each band being anchored at one end of the frame 11 as at 48. The opposite end of each brake band may be connected to a separate lever, but it is preferable to connect it to the control lever 36 above its pivot point 37. In this way, the band extends over a large part of the surface of its drum. Furthermore, the band is of such length that when the lever is moved to disconnect the gear 44 from the gear 43, the band is drawn tightly over the drum, or in other words, a brake is applied.

In use, the child sits on the seat 12 and rests his feet on the pedals 33 or the pedal crank 32. When he wishes to go forward, it is only necessary to draw the control levers 36 rearwardly and to turn the pedal crank with his feet. As the gears 43 and 42 are in mesh, the wheels 15 are turned. At this time, the brakes are released. When both control levers are moved forwardly, the pedal crank is disconnected from the wheels 15, and the brake bands 47 are drawn tightly on to the brake drums 42 so the vehicle stops. In order to turn the vehicle it is only necessary to move one control lever forwardly and the other rearwardly, at which time the vehicle will turn toward the side on which the forward lever is located. Actually, the brake is applied on that side of the vehicle while the wheel 15 on the other side is driven so that a turn is executed.

By having the tread belts 24, the vehicle can be operated on very rough ground and it can even climb other reasonably high obstacles. Furthermore, the normal resistance offered by these belts will prevent the vehicle from travelling too fast down a steep slope. When the control levers are moved rearwardly, the forward movement of the vehicle may be controlled by the feet on the pedals 33, and when said levers are moved forwardly, the brakes will stop it. As the control levers are fairly long and their pivots are near the lower ends thereof, a great deal of leverage is obtained when the brakes are applied.

While the drive and brake mechanism has been shown at the front end of the vehicle, it is obvious that they could be located at the rear end if desired. Furthermore, the tread belts may be omitted, in which case, the vehicle would act more like an ordinary cart or wagon.

What we claim as our invention is:

1. A toy vehicle comprising a frame, a body carried by the frame, a pair of wheels at each side of the body, a support mounted on the frame adjacent each wheel of one pair of wheels, an arcuate slot in each support, a floating pedal crank extending transversely of the body through the arcuate slots of the supports, a gear connected to each wheel of the above-mentioned pair of wheels, a gear on each end of the crank adapted to mesh with one of the wheel gears, a lever pivotally mounted at its lower end adjacent each arcuate slot, an extension on each lever projecting from the pivot thereof, a bearing in each extension for carrying the adjacent end of the pedal crank, each lever being adapted selectively to move the gear on its end of the crank into and out of engagement with its wheel gear, said crank moving in the arcuate slot during this action, and means operated by each lever for braking a wheel when the lever moves to the crank gear controlled by it out of engagement with its wheel gear.

2. A toy vehicle comprising a frame, a body carried by the frame, a pair of wheels at each side of the body, the wheels on each side of the body being aligned, an endless fabric tread belt extending around the aligned wheels on each side of the body, a support mounted on the frame adjacent each wheel of one pair of wheels, an arcuate slot in each support, a floating pedal crank extending transversely of the body through the arcuate slots of the supports, a gear connected to each wheel of the above-mentioned pair of wheels, a gear on each end of the crank adapted to mesh with one of the wheel gears, a lever pivotally mounted at its lower end adjacent each arcuate slot, an extension on each lever projecting from the pivot thereof, a bearing in each extension for carrying the adjacent end of the pedal crank, each lever being adapted selectively to move the gear on its end of the crank into and out of engagement with its wheel gear, said crank moving in the arcuate slot during this action, and means operated by each lever for braking a wheel when the lever moves to the crank gear controlled by it out of engagement with its wheel gear.

3. A toy vehicle comprising a body, a pair of wheels at each end of the body, the wheels on each side of the body being aligned, an endless tread belt extending around the aligned wheels on each side of the body, a brake drum on the inner side of each wheel of one pair of wheels, an internal gear mounted within each drum, a floating pedal crank extending transversely of the body and extending into the opposite brake drums, a gear on each end of the crank adapted to mesh with the adjacent wheel gear, a lever pivotally mounted on the body and connected to each end of the crank, each lever being adapted selectively to move the gear on its end of the crank into and out of engagement with its wheel gear, and a brake band extending over the surface of each drum, each band being anchored at one end and connected to a lever at its opposite end, whereby each band is tightened on its drum when the lever is moved to disconnect the gear thereof from its wheel gear.

JAMES M. JOHNSTON.
C. BRUCE PATTERSON.

REFERENCES CITED

The following references are of record in the file of this patent:

UNITED STATES PATENTS

| Number | Name | Date |
|---|---|---|
| 77,478 | Gleason | May 5, 1868 |
| 252,504 | Otto | Jan. 17, 1882 |
| 355,375 | Brown | Jan. 4, 1887 |
| 499,207 | Byers | June 13, 1893 |
| 1,184,008 | Norelius | May 23, 1916 |
| 1,376,347 | McComb | Apr. 26, 1921 |
| 2,305,072 | Fetters | Dec. 15, 1942 |